US007942736B2

(12) United States Patent
Mincey et al.

(10) Patent No.: US 7,942,736 B2
(45) Date of Patent: May 17, 2011

(54) PATH OR FLOW BASED BONUS GAME

(75) Inventors: Jeff Mincey, Reno, NV (US); Michael DePalma, Reno, NV (US)

(73) Assignee: Bally Gaming International, Inc., Las Vegas, NV (US)

( * ) Notice: Subject to any disclaimer, the term of this patent is extended or adjusted under 35 U.S.C. 154(b) by 1511 days.

(21) Appl. No.: 11/129,038

(22) Filed: May 12, 2005

(65) Prior Publication Data

US 2006/0003832 A1 Jan. 5, 2006

Related U.S. Application Data

(60) Provisional application No. 60/570,884, filed on May 13, 2004.

(51) Int. Cl.
*A63F 13/00* (2006.01)

(52) U.S. Cl. ............................... 463/25; 463/20; 463/26

(58) Field of Classification Search .................... 463/26, 463/20, 25
See application file for complete search history.

(56) References Cited

U.S. PATENT DOCUMENTS 5,980,384 A * 11/1999 Barrie ............................ 463/16
5,996,997 A * 12/1999 Kamille ......................... 273/139
6,761,633 B2 * 7/2004 Riendeau et al. ............... 463/16

OTHER PUBLICATIONS

Nintendo, Pipe Dream Instruction Manual, Copyright 1988, pp. 1-17.*
Jaibo Software, Pipe Fun, Copyright 2000-2002, pp. 1-4.*
Super Nintendo Entertainment System, Tetris and Dr. Mairo, Copyright 1994, pp. 1-30.*

* cited by examiner

*Primary Examiner* — Dmitry Suhol
*Assistant Examiner* — Melina K. Rustemeyer
(74) *Attorney, Agent, or Firm* — Steptoe & Johnson LLP

(57) ABSTRACT

The present invention is a player participatory bonus game intended for use in a gaming environment. After a primary game event triggers play of the bonus game, the player is presented with a game arena which shows start points, end points, and locations in between where game pieces may be placed. The game pieces are specially themed so that the player wins by created a path or flow from a start point to an end point, using selected bonus pieces and placing them on the indicated location points.

20 Claims, 5 Drawing Sheets

Gaming Machine
Or Player Terminal

Example Embodiment Of Secondary Game Board

Example Embodiment Of Secondary Game Board Pieces

Pathway Game Method For Player

Example 20 Credit Win

PATH OR FLOW BASED BONUS GAME

RELATED APPLICATIONS

This application claims the benefit of provisional application 60/570,884 filed on May 13, 2004.

BACKGROUND OF THE INVENTION

1. Field of the Invention

This invention pertains generally to gaming machines whose outcome is based at least partially on a random event. More particularly, the invention relates to a bonus or secondary game where the player makes choices on where to place game pieces on a grid that completes a visual path or flow.

2. The Prior Art

Passive bonus games in gaming environments are generally known. A typical passive bonus game involves a player initiating a bonus round with the touch of a button, after which gaming events occur and are displayed to the player, resulting in some kind of payout (outside the US, it may also result in a loss). Initially passive bonus games, including progressive bonus games, were quite interesting to players; with the proliferation of such bonus games player interest has leveled off. There is a need to provide additional interest and participation with novel bonus games that are different from the traditional passive bonus games.

BRIEF DESCRIPTION OF THE INVENTION

The present invention is a new and novel bonus game in a gaming environment. It is based on the concept of interactively creating flows or pathways to awards through the placement of certain playing pieces, from a start location to an end location.

The present invention encompasses a bonus game having actions that are based on the generation of pathways by a player. The bonus game is designed to be used in a gaming environment where there is a primary game whose outcome is based at least partially on a random event, and where the primary game has at least one trigger or game event that will start bonus game play.

The bonus game starts by showing a player a game board or game arena (may take up the entire display) with scenery to match the path theme, such as canals in Italy or train tracks in a train station. The player is also shown where playing pieces may be placed on the arena. The playing pieces will have visual images that match the theme of the game, such as canals for the Italy-based theme or railroad tracks for the train station theme. The player then picks a playing piece from a plurality of playing pieces, which are initially shown "face-down" so the player can't see what visual connectivity each piece has. Alternatively, the player may simply be "given" a piece which they have to place. Any piece selection mechanism may be used.

The piece is then shown to the player (if the piece is given to the player by the gaming machine, it may be shown face-up from the start). The player then decides where to place the piece on the game arena. The goal of the player is to maximize the likelihood of creating a path from a starting point to an end point. The amount won may be designated or assigned to each endpoint. Alternatively, there may be values assigned to start points and to individual playing pieces, with final win amounts dependent on those amounts in part or in whole.

The bonus game can end in several ways. It is expected that there will be a plurality of implementations. Examples include, but the game of the present invention is not limited to: ending after the selection (or generation) of "N" pieces with the player having to decide to go for a smaller, more likely win or a larger, less likely win (described further below); ending upon the selection of one or more designated game termination pieces; ending after a designated amount of time; ending after the first path from one start location to one end location is generated; ending after a piece cannot be placed with the required connectivity; etc. These halt conditions may also be combined in the rules of any particular implementation.

One important concept of the present invention is that the playing piece form a visual connection pattern when used to win a bonus. Examples include forming connections with railroad tracks that would visually allow a train to use them, canals that connect to allow water and a boat to flow through them, plumbing that allows liquid to flow through it, walkways that allow a person to perambulate the path without leaving the walkways, etc. Obviously the entities using these paths are cartoon entities.

BRIEF DESCRIPTION OF THE DRAWINGS

The present invention will be more fully understood by reference to the following drawings, which are for illustrative rather than limiting purposes.

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

Figure 1:
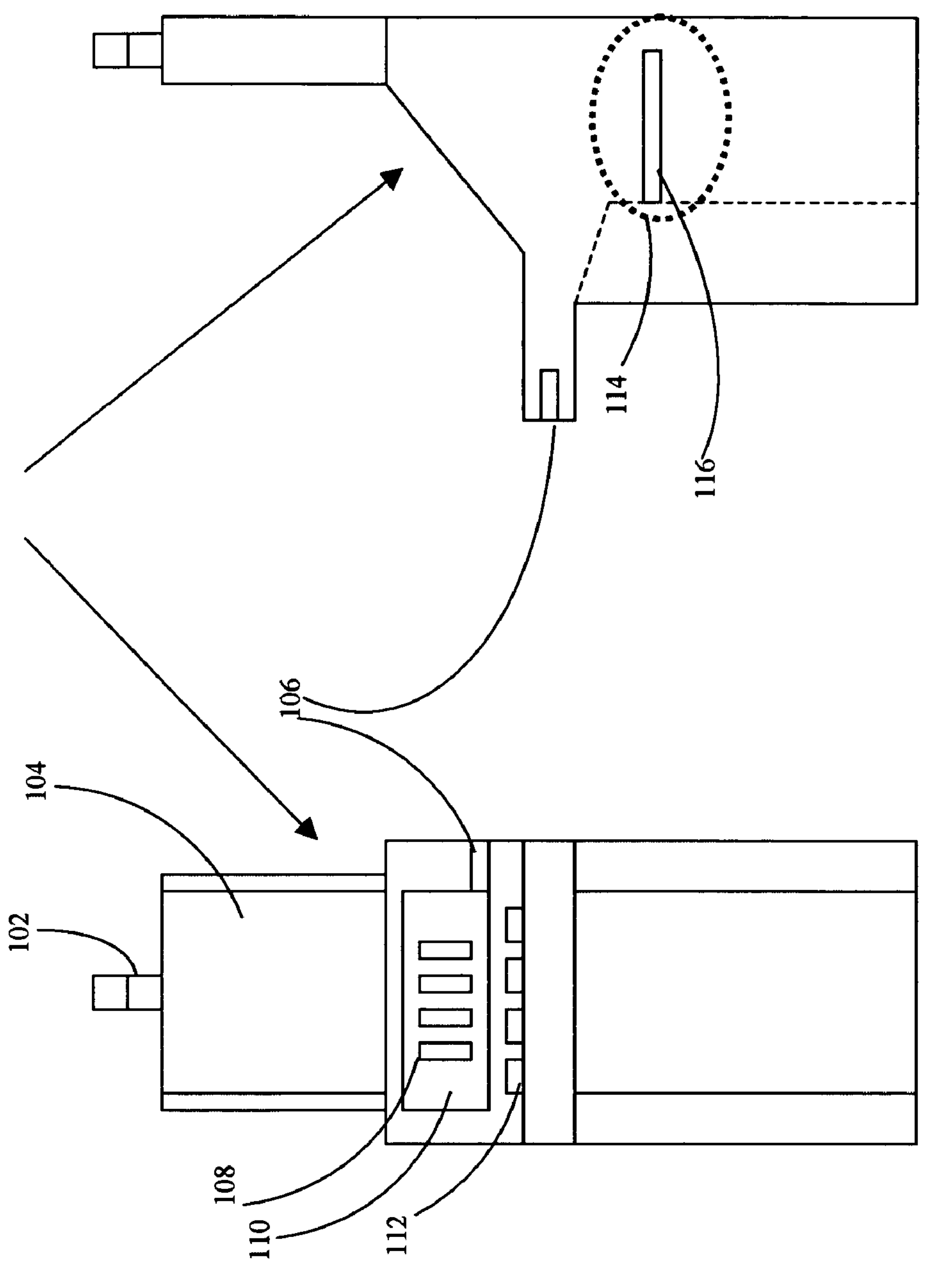
FIG. 1 depicts a gaming machine in accordance with the present invention.
Figure 2:
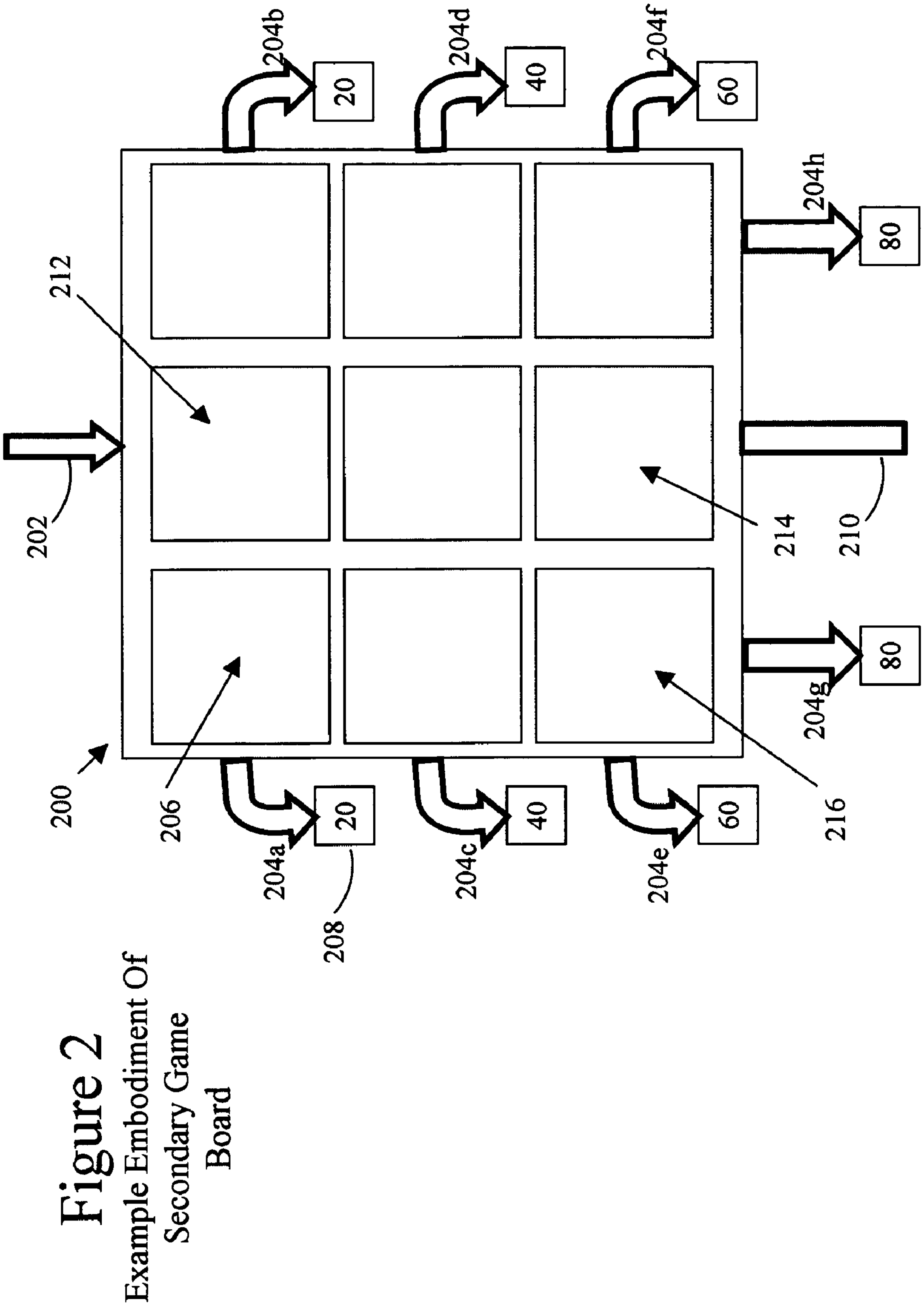
FIG. 2 depicts an exemplar embodiment bonus or secondary game display in accordance with the present invention.
Figure 3:
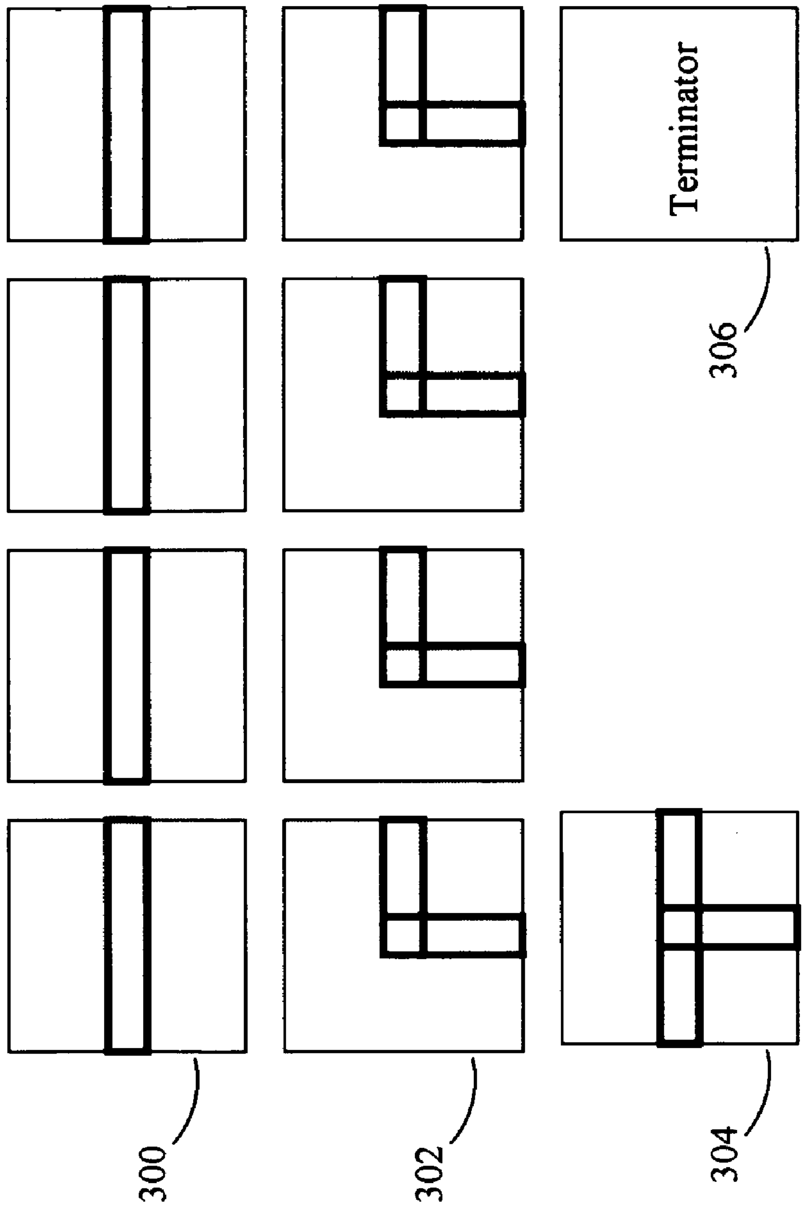
FIG. 3 depicts game pieces for use with the game board shown in FIG. 2.
Figure 4:
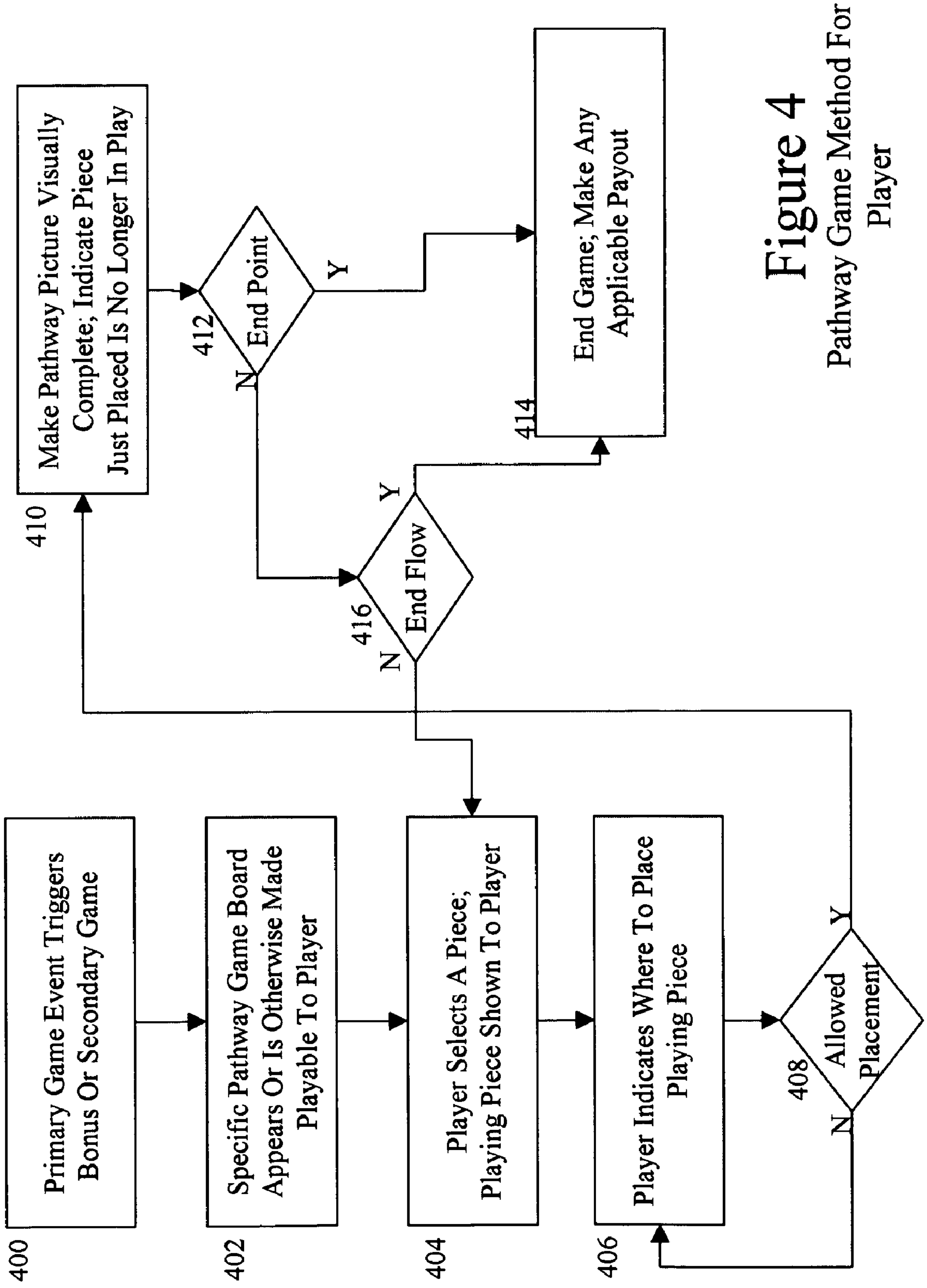
FIG. 4 is a flow diagram of a method of game play in accordance with the present invention.

Referring more specifically to the drawings, for illustrative purposes the present invention is embodied in the apparatus shown FIG. 1 through 3, and the method outlined in FIG. 4. It will be appreciated that the apparatus may vary as to configuration and as to details of the parts, and that the method may vary as to details, inclusion or exclusion of acts, and the order of any acts without departing from the inventive concepts as disclosed herein.

In one embodiment, the bonus game of the present invention is implemented on a player terminal or game device. A suitable player terminal can be of well known construction, including the ordinary internals needed in order to have a functioning primary game of chance (the primary game may be any game, including but not limited to video or mechanical reels, video poker, keno, bingo, central determination jurisdiction machines, etc.). Components typically include at least one programmable central processor and associated memory, programming for the primary game and the secondary or bonus game of the present invention, and input/output interfaces to the rest of the terminal peripherals found in a player terminal (video display or electromechanical reels, buttons, coin heads, bill acceptors, top boxes, voucher reader/printers, etc.). The main logic unit is typically configured into a main processor board with peripheral interfaces to the video display, control buttons and lever, monetary input devices, at least one network interface (may be on the main board or implemented as a standalone interface and logic unit), together with the firmware and software needed to implement the full functionality of the peripherals with the main game logic and its system. This description is an overview of a player terminal usable with the present invention and is not limiting: any player terminal having a programmable display for a secondary game (may be the same display as used by the primary or not) may be used. The bonus game of the present invention may also be in its own cabinet, usable as a shared secondary game between a plurality of primary games. The player terminals and/or the bonus game may be configured for Nevada-style Class 3 gaming or configured for a central determination jurisdictions.

An example of a slant-top style gaming machine is shown in FIG. 1. Gaming machine 100 has a top candle 102, a glass art area 104, bill acceptor 106 (shown in two typical locations), video reel display area 108, reel panel 110 (may be part of the video display, especially if the gaming machine has no mechanical components), and player input devices (usually buttons) 112. Inside player terminal 100 at location 114 (which is inside the gaming machine) are game logic components 116, usually comprising a main processor board as described in the above paragraph.

This is one exemplar gaming machine usable with the present invention. Any machine usable in a gaming environment that will support the logic needed to implement the bonus game of the present invention may be used.

FIG. 2 shows one embodiment of a bonus game board in accordance with the present invention. This will provide an illustration of what is meant by a path- or flow-based bonus game which makes use of player participation.

Bonus game board 200 contains 9 game piece locations, shown generally as 206 (grid 206). In general there may be any number of locations, but it is expected that most games will have from 8 to 20 in order to allow enough variation to create interest for players, while limiting the amount of time a player is playing the bonus game. Inlet arrow 202 shows where the “flow” or “path” starts, by pointing to start location 212. Outlet arrows 204*a* through 204*h* show associated bonus game endpoints, where each bonus game endpoint has an associated end location. For example, bonus game endpoint 204*a* is associated with end location 206. Each game endpoint has a point value associated with it; for example value 208 is associated with endpoint 204*a*.

The bonus game concept of the present invention is to connect inlet 202 with one outlet (204*a*-204*h*) in a visually associative manner, and win the value associated with the endpoint. To visually associate a start location with an end location, one or more playing pieces must be placed on locations on the bonus game grid such that a visually associative path is created between the start location and an end location. The visual path is intended to be continuous in order to create the visual impression of a path one could follow by waling, a connection water could flow through, wiring electricity could flow through, or any similar path or flow concept. On board 200, one example path would connect start location 212 with end location 206 (using two game pieces) using pieces that visually connect the locations (paths, pipes, canals, etc.).

In addition to endpoints 204*x*, also shown on game grid 200 is unique connector 210. In some embodiments connector 210 will be an endpoint. In other embodiments connector 210, if reached, will lead to a next level of game board where at least one, but preferable all, values associated with endpoints are larger than the previous game board(s). In one embodiment, the selection of playing pieces for upper levels of game boards are different than the selection for lower levels.

FIG. 3 shows example game pieces usable with game board 200 in FIG. 2. In this embodiment, a player has available to them 4 straight connectors 300, 4 90-degree connectors 302, and 1 “T” connector 304.

Also shown is terminator playing piece 306. It is expected that the path- or flow-themed game of the present invention will be embodied in a variety of bonus games, each having differing rules. One embodiment may make use of a terminator piece 306. The rules of a path- or flow-themed bonus game could be that the bonus games ends when a player selects the termination piece. Termination piece 306 may also be used in conjunction with other rules, such as:

ending the game when the player either makes a visually associative connection between the start location and an end location or when a termination piece is selected, whichever comes first;

ending the game when a specified time period runs out or when a termination piece is selected, whichever comes first;

ending the game when a pre-designated number of non-termination playing pieces are selected or when a termination piece is selected, whichever comes first.

In each case above, the rules could be implemented individually as well as in combination (i.e., the bonus game ends after N playing are selected, after a time-out period, etc.). Other rule variations will come to the mind of a person of skill in this art who also has the benefit of the present disclosure. All such variations are included within the inventive concepts of path- or flow-themed bonus games.

Continuing with FIG. 3, the playing pieces will be shown on the game board “upside down,” so the player doesn't know which piece is which. There would typically be a help screen or a small visual insert listing the pieces so the player will know what the possibilities are, and may even show which pieces are remaining after each piece is played. The player makes a selection of a piece, which is then “turned over” or otherwise shown to the player. The player may then place the piece on the game board in accordance with the rules of the particular embodiment. In this example, the player may rotate the piece as they see fit, and then place the piece anywhere on the grid.

If the player got a 90-degree piece (302), the player could rotate it counterclockwise 90 degrees and place it on location point 214. In doing that, the player is hoping they will draw either two straight pieces 300 and one more 90-degree piece 302 before the bonus game ends, or three straight pieces 300 before the bonus game ends. This would allow the player to visually connect start location 212 with location 214, and then visually connect location 214 to end location 216. Note that the present invention allows a single end location (216) to visually connect to a plurality of awards, in this case either 204*e* (using a straight connector) or to 204*g* (using a 90-degree connector). The bonus game logic can easily determine which visually associated path was completed.

In this embodiment, the player will be limited to 4 draws and the game will not make use of a terminator piece. The risk the player is taking is that she/he will run out of draws before completing the relatively high-paying path or flow of a 60 or an 80 credit win. The player could play it safe and place the first piece at location 212, then all the player needs to do is to draw one straight piece in the next three to win 20 credits.

As discussed above, bonus games embodying the present invention may be implemented with a wide variety of rules. In the example just discussed, the player can place each piece anywhere on the grid and in any orientation, but is limited to 4 draws. In other embodiments, the player will be required to place each piece so that it is visually connected to an existing piece (or start/end point) already on the grid. In another variation, the player may not be allowed to visually rotate playing pieces once they are made visible.

As will be readily seen by a person having skill in the art of implementing bonus games for gaming machines, the bonus game of the present invention can readily be designed to accommodate predetermined win amounts, where the amount to be won has been determined before the bonus round starts, or, where the rules allow an unknown bonus payout (the range is always defined by the game rules and values of the endpoints).

Thus, the rules of any particular embodiment can be extremely variable while staying within the inventive concepts of the present invention. In addition, the visual representations of paths or flows for games constructed in accordance with the present invention is amenable to a great many variations. The representation may be wires (electrical connections), pipes, ladders, streets, rivers, lava flows, yellow brick roads, railroad tracks, etc. Anything that illustrates a path or flow when finished can be used.

The use of "game grid" or "game board" is intended to cover any visual representation showing players where they may place bonus game pieces. Although typically rectangular in overall shape, the grid may be displayed showing location points (where playing pieces may be placed or located) any where on the game display, in any relative shape or positioning, as long as the associated game pieces may be placed such that a visually connective path or flow is creatable between a start location and an end location. Numerous variations within the inventive scope of the present invention will come to the mind of a game developer having the benefit of the present disclosure.

Award values shown on the game board may or may not be determined by the local player terminal. It is expected that in Nevada-style gaming establishments, random game results generated in the gaming machine (player terminal) will be used to determine the amount of any prizes or awards, or the amounts will be derived from a form of shared progressive. The present bonus game is equally well suited for central determination style games (lottery, bingo, etc.), in which case the amounts shown on the game endpoints, coupled with the bonus game programming determining which game pieces a player will be shown when a player picks a piece to turn over, will enable the predetermined award to be given to the player. Note: other central determination style solutions may be used as well, including but not limited to having no values shown at the endpoint and then showing what the player won when the player reaches an endpoint, thus ensuring the player gets the predetermined award.

FIG. 4 illustrates one method using the present invention. A player is using a gaming machine having therein a secondary game in accordance with the present invention. Starting in box 400, a game event occurs in the primary game that triggers the bonus game. Box 400 is left for box 402, where the actions associated with the box include making the themed game grid or game board either visible to, or playable by, the player.

Continuing into box 404, a player selects a playing piece using some kind of player input device (touchscreen, button, etc.). The piece is then shown to the player. Continuing into box 406, the player indicates where to place the piece, and with what orientation.

Diamond 408 determines if the requested placement is allowed by the rules of the game. As explained above, there are numerous embodiments of specific rules that fall within the inventive nature of the present invention. If the requested placement is allowed, then the "Y" exit is taken to box 410. If the requested placement is not allowed, then the "N" exit is taken back to box 406 where the game requests the player to select placement of the piece (the game may or may not explicitly warn the player to make a different choice).

Box 410 corresponds to the actions of making the current state of the pathway game's image complete. This will be done in whatever way is consistent with the rules of the game. For example, if the game only allows placement of pieces which result in the creation of a continuum of visual flow, the visual representation may include presenting an image of a single connected pathway. If the game allows placement of disconnected pieces, the completion of the image may mean to simply "lock in" the image onto the game board where the player requested. In any case, the current state of the game board will reflect the placement of the added piece. Typically the piece just placed is no longer amongst the pieces left to be selected is optional. Some game implementations will show the player what playing pieces are left, some will not.

Box 410 is left for diamond 412. The actions corresponding to diamond 412 are those needed to determine if an end-of-game point has been reached. If the answer is no, the "N" exit is taken back to diamond 416. If the answer is yes, the "Y" exit is taken to box 414. The actions corresponding to box 414 are those taken when the game ends and any amounts won the by the player is awarded (game credits, prize voucher, etc.).

When the "N" exit is taken from diamond 412 to diamond 416, the actions corresponding to diamond 416 are those associated with determining if the player has placed a game piece such that no path is possible. Note that some games will be implemented to allow disconnected pieces, in which case the game logic would simply continue straight into box 404. If there is a choice, it is determined if the just-placed piece blocks any possible path or flow. If it does, the "Y" exit is taken to box 414, where the game ends with either no reward (if awards are based on endpoints only) or an award is tallied up (if some or all of the award is based on the number of pieces played, for example, not just an endpoint value, or if the game allows a plurality of connected endpoints to be created). If the "N" exit is taken to box 404, the player starts the cycle of choosing a next game piece.

Figure 5:
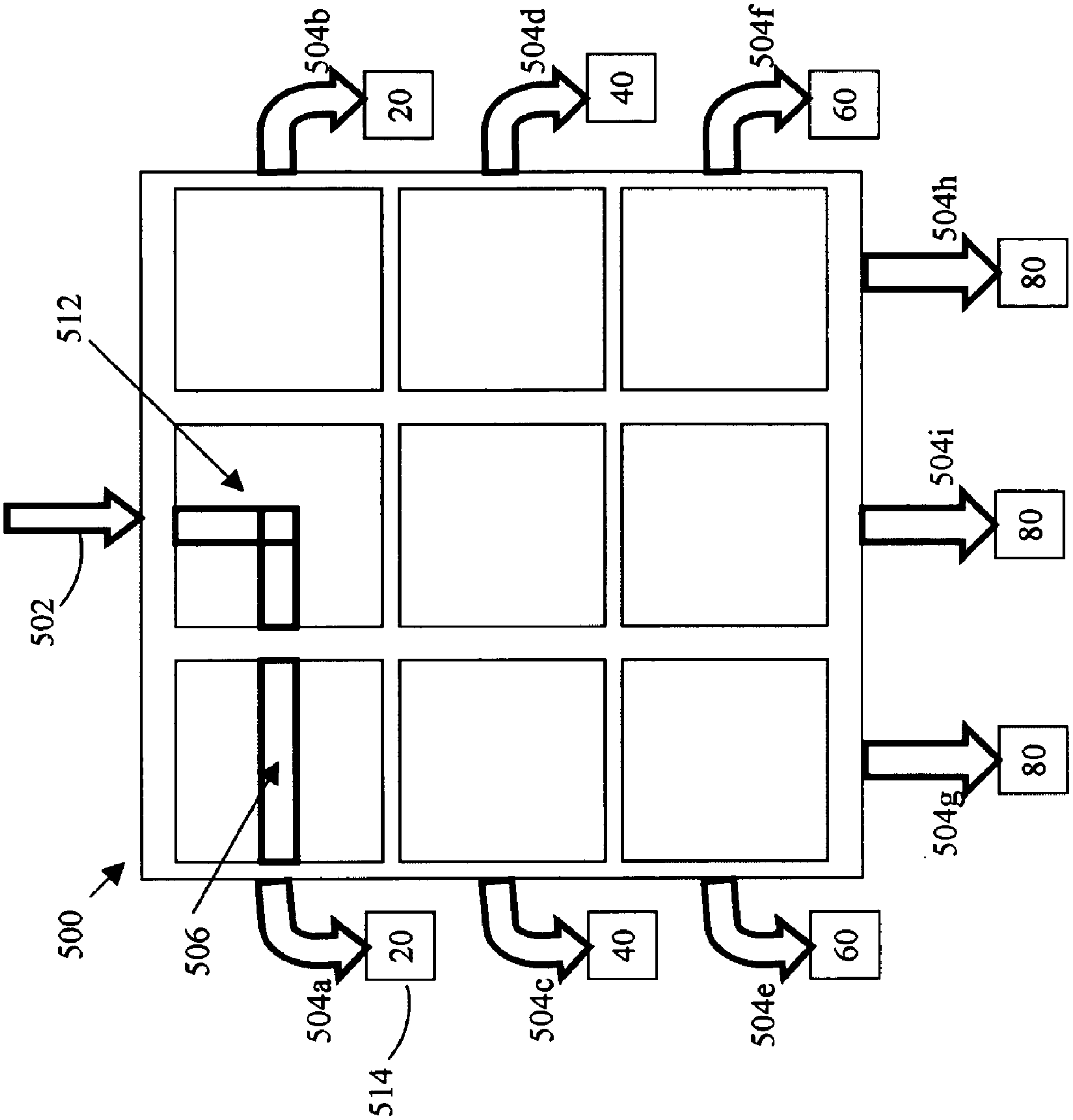
FIG. 5 is a simple illustrative example of a wining pathway (or flow) game event.

FIG. 5 shows a simple exemplar 20 credit win on game arena 500. Start arrow 502 indicates the single start location 512. Endpoints 504*a*-504*i* show where a game could end, at each associated end location. For example, endpoint 504*a* has end location 506 with bonus value 514. In this simple game, a player was presented with two playing pieces, a 90-degree piece and a straight piece. The player positioned the pieces at locations 512 and 506 respectively, ending the bonus game for a 20 credit win. The flow is completed from the start point to the end point through the path created by the placement of the two pieces. In an actual game, the graphics would properly reflect the themed flow (water through canals, trains over a track, people on a walkway, etc.).

Other embodiments encompassed by the bonus game of the present invention include, but are not limited to: playing pieces containing straights, curves, forks, or terminators; additional playing pieces such as multipliers or bonuses that may be placed with connecting pieces; the board may have one or more starting points and/or one or more end points and may have one or more continuation points which lead to additional playing areas or to other games; each end point may have a reward associated with it which is either shown at the start of the game or is shown after reaching the endpoint; and, individual playing pieces may have an award or value associated with them.

The invention claimed is:

1. A method of play of a bonus game in a gaming environment comprising:

providing a primary game whose outcome is based at least partially on a random event, and further having an outcome which triggers said bonus game;

allowing play of said primary game until said bonus game is triggered;

starting said bonus game by showing a plurality of locations, said locations indicating where bonus game pieces may be placed during play of said bonus game, said locations further including a start location and a plurality of end locations such that at least one game piece is required to visually connect said start location to any one of said end locations;

selecting a first playing piece from a plurality of available playing pieces, said first playing piece's visual connection pattern not visible prior to selection;

enabling said selected first playing piece's visual connection pattern to be visible;

allowing placement of said selected first playing piece in a manner consistent with rules for said bonus game;

selecting a second playing piece, said second playing piece's visual pattern not visible until after placement of the first playing piece and a player enables said second playing piece's visual pattern to be visible;

repeating selection and placement of playing pieces until, according to said rules for said bonus game, said bonus game is ended;

determining if there is a visually connective pattern between said start location and one of said end locations; and awarding a bonus associated with said visually connected end location, if there is a visually connected end location, if there is a visually connected end location.

2. The method of claim 1 where said visually connective pattern comprises visual representations of one of: walkways; plumbing; canals; electrical connections; ladders; streets; rivers; lava flows; railroad tracks; or, yellow brick roads.

3. The method of claim 1 where said bonus comprises credits.

4. The method of claim 1 where said bonus comprises continued play of said bonus game at a next level, said next level comprising at least one enhanced award associated with at least one end location.

5. The method of claim 1 where said rules further comprises ending said bonus game play when the first of two events occur, said two events being making a visual connection between said start location and any end location, or, choosing N playing pieces, where N is a positive integer known at the start of said bonus game.

6. The method of claim 1 where said rules further comprises ending said bonus game play when the first of two events occur, said two events being making a visual connection between said start location and any end location, or, choosing a bonus game termination playing piece.

7. The method of claim 1 where said rules comprises enabling visual rotation of said selected playing piece before placement on a location.

8. The method of claim 1 where said rules further comprise ending said bonus game play when a bonus game termination playing piece is chosen, without regard to how many visual connections are made between said start location and any of said end locations.

9. The method of claim 1 where said rules further comprise ending said bonus game play after a designated time period, without regard to how many visual connections are made between said start location and any of said end locations.

10. The method of claim 1 further comprising:

limiting a number of selection of playing pieces to four;

providing a game board with exactly nine locations for placement of playing pieces;

providing the game board with exactly eight end locations each with associated values and exactly one connector, where the one connector can be an end location or can lead to a next level of game board where values associated with end locations are larger than those of a previous game board; and permitting placement of playing pieces anywhere on the game board to continue play regardless of whether a game piece to game piece visual connection pattern is made with an existing game piece previously placed on the game board.

11. The method of claim 1 further comprising:

providing a game board, the game board including the plurality of locations for placement of playing pieces;

permitting placement of playing pieces anywhere on the game board to continue play regardless of whether a game piece to game piece visual connection pattern is made with an existing game piece previously placed on the game board.

12. A method of play of a bonus game in a gaming environment comprising:

providing a primary game whose outcome is based at least partially on a random event, and further having an outcome which triggers said bonus game;

allowing play of said primary game until said bonus game is triggered;

starting said bonus game by showing a plurality of locations, said locations indicating where bonus game pieces may be placed during play of said bonus game, said locations further including a plurality of start location and a plurality of end locations such that at least one game piece is required to visually connect any one said start location to any one said end location;

selecting a first playing piece from a plurality of available playing pieces, said first playing piece's visual connection pattern not visible prior to selection;

enabling said selected first playing piece's visual connection pattern to be visible;

allowing placement of said selected first playing piece in a manner consistent with rules for said bonus game;

selecting a second playing piece, said second playing piece's visual pattern not visible until after placement of the first playing piece and a player enables said second playing piece's visual pattern to be visible;

repeating selection and placement of playing pieces until, according to said rules for said bonus game, said bonus game is ended;

determining if there is a visually connective pattern between said start location and one of said end locations; and awarding a bonus associated with said visually connected end location, if there is a visually connected path from at least one of said start locations to at least one of said end locations.

13. The method of claim 12 where said visually connective pattern comprises visual representations of one of: walkways;

plumbing; canals; electrical connections; ladders; streets; rivers; lava flows; railroad tracks; or, yellow brick roads.

14. The method of claim 12 where said bonus comprises credits.

15. The method of claim 12 where said bonus comprises continued play of said bonus game at a next level, said next level comprising at least one enhanced award associated with at least one end location.

16. The method of claim 12 where said rules further comprises ending said bonus game play when the first of two events occur, said two events being making a visual connection between any one of said start locations and any one of said end locations, or, choosing N playing pieces, where N is a positive integer known at the start of said bonus game.

17. The method of claim 12 where said rules further comprises ending said bonus game play when the first of two events occur, said two events being making a visual connection between any one of said start locations and any one of said end locations, or, choosing a bonus game termination playing piece.

18. The method of claim 12 where said rules comprises enabling visual rotation of said selected playing piece before placement on a location.

19. The method of claim 12 where said rules further comprise ending said bonus game play when a bonus game termination playing piece is chosen, without regard to how many visual connections are made between said start locations and said end locations.

20. The method of claim 12 where said rules further comprise ending said bonus game play after a designated time period, without regard to how many visual connections are made between said start locations and said end locations.

* * * * *

UNITED STATES PATENT AND TRADEMARK OFFICE

CERTIFICATE OF CORRECTION

PATENT NO. : 7,942,736 B2
APPLICATION NO. : 11/129038
DATED : May 17, 2011
INVENTOR(S) : Mincey et al.

It is certified that error appears in the above-identified patent and that said Letters Patent is hereby corrected as shown below:

Column 3
Line 56, change “waling” to --walking--

Column 3
Line 66, change “preferable” to --preferably--

Signed and Sealed this
Twelfth Day of July, 2011

David J. Kappos
*Director of the United States Patent and Trademark Office*